(12) United States Patent
Lehner

(10) Patent No.: US 9,079,512 B2
(45) Date of Patent: Jul. 14, 2015

(54) VEHICLE SEAT WITH ROLLER GUIDE

(71) Applicant: GRAMMER AG, Amberg (DE)

(72) Inventor: Norbert Lehner, Freihung (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/109,046

(22) Filed: Dec. 17, 2013

(65) Prior Publication Data

US 2014/0167484 A1    Jun. 19, 2014

(30) Foreign Application Priority Data

Dec. 17, 2012 (DE) .......................... 10 2012 112 430

(51) Int. Cl.
*B60N 2/06* (2006.01)
*B60N 2/07* (2006.01)
*B60N 2/50* (2006.01)

(52) U.S. Cl.
CPC ............ *B60N 2/0722* (2013.01); *B60N 2/0715* (2013.01); *B60N 2/0747* (2013.01); *B60N 2/508* (2013.01); *B60N 2205/20* (2013.01)

(58) Field of Classification Search
CPC ..... B60N 2/0715; B60N 2/075; B60N 2/0722
USPC ............. 297/344.11; 248/430; 384/47, 54, 58
See application file for complete search history.

(56) References Cited

U.S. PATENT DOCUMENTS

| | | | | |
|---|---|---|---|---|
| 3,891,269 A | * | 6/1975 | Moeser ...................... 248/430 X |
| 4,863,289 A | * | 9/1989 | Lecerf .............................. 384/47 |
| 4,941,637 A | * | 7/1990 | Pipon ........................... 248/430 |
| 5,046,698 A | * | 9/1991 | Venier ........................... 248/430 |
| 5,222,814 A | | 6/1993 | Boelryk |
| 5,344,114 A | * | 9/1994 | Rees .............................. 248/430 |
| 5,499,788 A | * | 3/1996 | Rees .............................. 248/430 |
| 5,737,971 A | * | 4/1998 | Riefe et al. .................. 384/49 X |
| 2008/0164233 A1 | * | 7/2008 | Schroeder et al. ......... 248/430 X |

FOREIGN PATENT DOCUMENTS

| | | |
|---|---|---|
| DE | 2940424 | 4/1980 |
| DE | 102006059088 | 6/2008 |
| FR | 2567463 | 1/1986 |

OTHER PUBLICATIONS

Official Action (no English translation available) for German Patent Application No. 102012112430.2 dated Aug. 9, 2013, 3 pages.

* cited by examiner

*Primary Examiner* — Rodney B White
(74) *Attorney, Agent, or Firm* — Sheridan Ross P.C.

(57) ABSTRACT

A vehicle seat with roller guide is provided, wherein the roller guide includes at least one guide rail, which is at least partially open at the side, and at least one roller which rolls in the guide rail and is connected by at least one shaft to parts of the vehicle seat, wherein a roller cover part of the roller can roll with a running surface of the roller along an inner wall, on the lower side of the roller, of the guide rail arranged parallel to or at an angle to the longitudinal course of the axis, wherein at least the roller cover part of the roller is made from material that can be deformed by pressurization by means of seat occupation and in a movement-free state without seat occupation rests on the inner wall, on the lower side of the roller, and an inner wall, running parallel thereto on the upper side of the roller, of the guide rail so as to make contact.

13 Claims, 3 Drawing Sheets

VEHICLE SEAT WITH ROLLER GUIDE

CROSS-REFERENCE TO RELATED APPLICATIONS

This application claims the benefit of German Application No. 10 2012 112 430.2 filed Dec. 17, 2012, the disclosure of which is incorporated herein by reference.

The invention relates to a vehicle seat with roller guide, wherein the roller guide comprises at least one guide rail, which is at least partially open at the side, and at least one roller which rolls in the guide rail and is connected by at least one shaft to parts of the vehicle seat according to the preamble of claim 1.

Roller guides for vehicle seats, in particular for rolling rollers which are connected to a scissor-type stand which extends forwards and backwards in the forward and backward directions when the vehicle seat swings up and down and therefore require rolling of the rollers inside the guide rail are generally known. Roller guides of this kind often exhibit the problem that inside the guide rails, which are usually U-shaped in cross-section, the rollers have a relatively large amount of play upwards and downwards since they would block themselves with respect to the abutting inner walls of the guide rail due to the opposing movements at their upper side and their lower side.

To avoid such play of the rollers inside the guide rails at least two rollers per roller bearing have previously been arranged inside the guide rail, namely one roller which rolls on an inner wall, on the upper side of the roller, of the guide rail but does not make contact with the inner wall, on the lower side of the roller, of the guide rail and a further roller, which makes contact with the inner wall on the lower side of the roller but does not make contact with the inner wall on the upper side of the roller. By this it can be achieved that a combination of two rollers of this kind can enable play-free rolling of the roller bearing and the parts secured thereto, such as for example the end of a scissor arm, inside the guide rail. Roller bearings of this kind with the help of at least two rollers, optionally with axes fixed in the height direction, are complex and cost-intensive to produce, however.

It is therefore the object of the invention to provide a vehicle seat with a roller guide which can be produced simply and inexpensively.

This object is achieved according to the features of claim 1.

A fundamental issue of the invention lies in that in the case of a vehicle seat with roller guide, wherein the roller guide comprises at least one guide rail, which is at least partially open at the side, and at least one roller which rolls in the guide rail and is connected by at least one shaft to parts of the vehicle seat, such as a scissor-type stand, and wherein a roller cover part of the roller can roll with a running surface of the roller along an inner wall, on the lower side of the roller, of the guide rail arranged parallel to or at an angle to the longitudinal course of the shaft, at least the roller cover part of the roller is made from material that can be deformed by pressurization by means of seat occupation. Furthermore, in a movement-free state without seat occupation the roller cover part should rest on the inner wall, on the lower side of the roller, and an inner wall, running parallel thereto on the upper side of the roller, of the guide rail so as to make contact.

Due to the construction of a roller cover part, which with a correspondingly thin design may also be called the circumferential surface, from deformable material, which can be deformed in the radial direction, it is advantageously achieved that, with the correct choice of material, the roller is sufficiently pressed in, and therefore deformed, at its lower side to no longer make contact at its upper side with the upper side inner wall of the guide rail and therefore blocking-free rolling of the roller inside the U-shaped guide rail is possible.

However, as soon as a person leaves the seat and the seat is therefore no longer occupied, there is then also insufficient pressurization for the roller in order to sufficiently deform it at its lower side in contact with the inner wall, on the lower side of the roller, of the guide rail, for which reason there is still contact of the upper side of the roller with respect to the inner wall, on the upper side of the roller, of the guide rail and blocking therefore occurs. By this kind of blocking of the roller inside the U-shaped guide rail it is achieved that when the person using the seat leaves the seat, it is automatically blocked in its height direction and therefore it is not possible for the person to be wedged between the steering wheel and the front edge of the seat part.

The material of the roller cover part may be a resilient material. All resilient substances, such as elastomers, thermoplastics, duroplastics and the like are suitable for this as long as they have sufficient resistance to wear due to the roller movement. PUR, polyurethane, in particular is suitable as coating material for a roller core part located therebelow.

The roller core part, which is located inside the roller cover part, is, as a rule, made from non-resilient material but may also be made from slightly resilient material. It is important that there is a durable join between the resilient roller cover material and the roller core material on the inside and located therebelow. The roller core material can by way of example be a metal or even a rigid plastics material such as a duroplastic.

All types of conventional rollers, such as for example cylindrical rollers, tyre-like rollers, annular rollers and the like are conceivable as forms of roller. Conical or truncated cone-shaped rollers are similarly conceivable, in which the inner walls of the guide rail obviously also have to be arranged at an angle to the axis on which the rollers are secured to constitute a correspondingly complementarily designed rolling surface for the truncated cone-shaped or conical rollers.

Additionally or alternatively, the roller cover part can include a large number of leaf-like elements which can be deformed in the radial direction of the roller and extend at least partially radially outwards. These leaf-like elements are preferably strip-like in design and extend in the axial direction with a first longitudinal strip side on a circumferential surface of the inner roller core part made from rather non-resilient material and with a second longitudinal strip side which is arranged spaced apart from the circumferential surface in the radial direction.

These leaf-like elements can also partially overlap in their strip shape. This becomes clear if the cross-section of the roller is considered, i.e. transversely to the longitudinal direction of the shaft.

These leaf-like elements can be constructed as spring-like elements in the form of leaf springs, so they always position themselves independently and therefore want to move outwards in the radial direction as soon as the seat is no longer occupied or there is no longer sufficient pressurization. Of course these leaf-like elements may also be any type of plastics material-type elements which not only have to terminate at one end of a side on the circumferential surface of the roller core part, but may also terminate on this circumferential surface with both ends and curve outwards in the radial direction between these two ends. This curve-like design is then pressed in with pressurization and therefore a reduction in the thickness of the roller cover part is achieved in order to release the roller from its blocking inside the guide rail.

The thickness of the roller cover part in the radial direction and the radius of the roller core part is preferably in a ratio from a range of 1:9 to 1:1, more preferably in a range of 1:2.

By means of the construction of a roller cover part in a resilient form and of a roller core part in a more or less non-resilient form it is made possible to use just one roller per roller bearing. This results in a reduction in material due to the manufacturing process, and therefore to a cost saving as well.

According to a preferred embodiment the deformable material of the roller cover part undergoes a reduction in its thickness of from 0.005 to 0.8 mm, preferably of from 0.01 to 0.3 mm on pressurization in the region of contact with the inner wall, on the lower side of the roller, of the guide rail. This reduction in thickness is enough to release the roller at its upper side and therefore remove the blocking of the roller inside the guide rail.

In the movement-free state without seat occupation with extended roller cover part the roller is preferably pressed so strongly against an inner wall, on the lower side of the roller, and the inner wall, on the upper side of the roller, of the guide rail that the roller is blocked inside the guide rail. The suitable material for the roller cover must be chosen for this in order, depending on the weight of the persons who might occupy the seat, to achieve sufficient compression of the roller cover part in the lower region with respect to the inner wall, so blocking is removed.

On the other hand, sufficient extension of the roller cover part should also occur, however, when the seat is not occupied in order to block the roller inside the guide rail, although it should also be possible for this blocking to be cancelled when the seat is occupied again by a lightweight person.

Advantageous embodiments emerge from the subclaims.

Advantages and expediencies can be found in the following description in conjunction with the drawings, in which.

Figure 1:
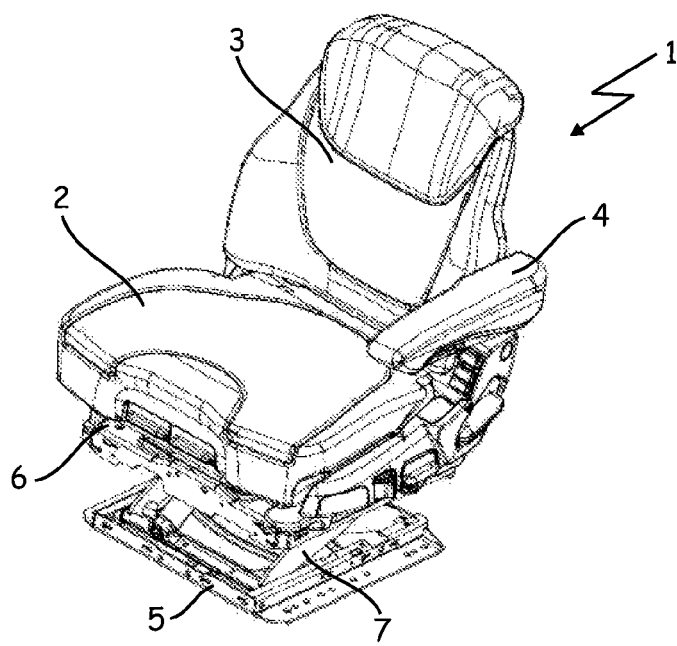
FIG. 1 shows a vehicle seat in a schematic perspective diagram.

FIG. 1 shows in a perspective illustration a vehicle seat 1 with a seat part 2 and a back rest 3. This vehicle seat likewise has an arm rest 4.

A lower part 5 is connected opposite an upper part 6 by means of scissor arms 7, it being possible for these two parts 5, 6 to move towards each other in the form that the upper part 6 is mounted so as to swing with respect to the lower part.

Figure 2:
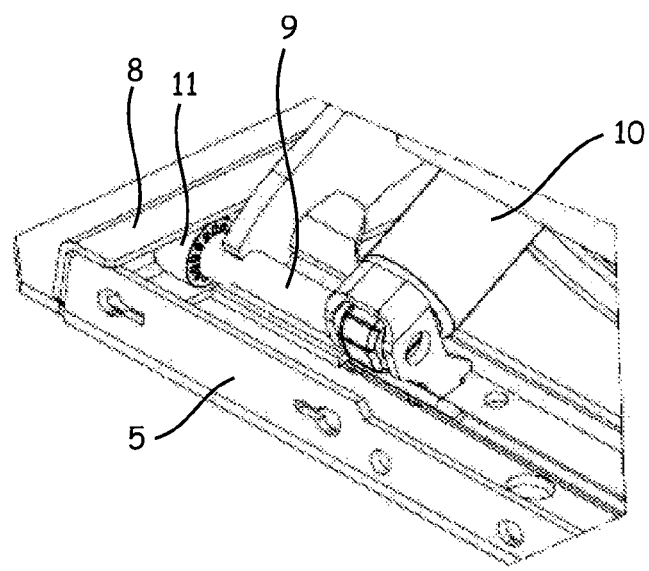
FIG. 2 shows in a perspective detail a portion of the vehicle seat according to the present invention with parts of the roller guide.

To allow the scissor arms to swing up and down they must be at least partially, and even at their lower ends, movably arranged in the longitudinal direction of the vehicle, i.e. in the forward and backward directions. As shown in FIG. 2 there are guide rails 8 present for this which preferably have a U-shaped cross-section and inside which rollers 11, in this case a roller 11, can be mounted so as to roll.

The roller 11 is arranged on an axis 9, to which parts of the vehicle seat are in turn secured, such as a damper 10, which is designed to have a damping effect on the upwards and downwards movement of the vehicle seat, i.e. of the upper part 6 with respect to the lower part 5.

Figure 3:
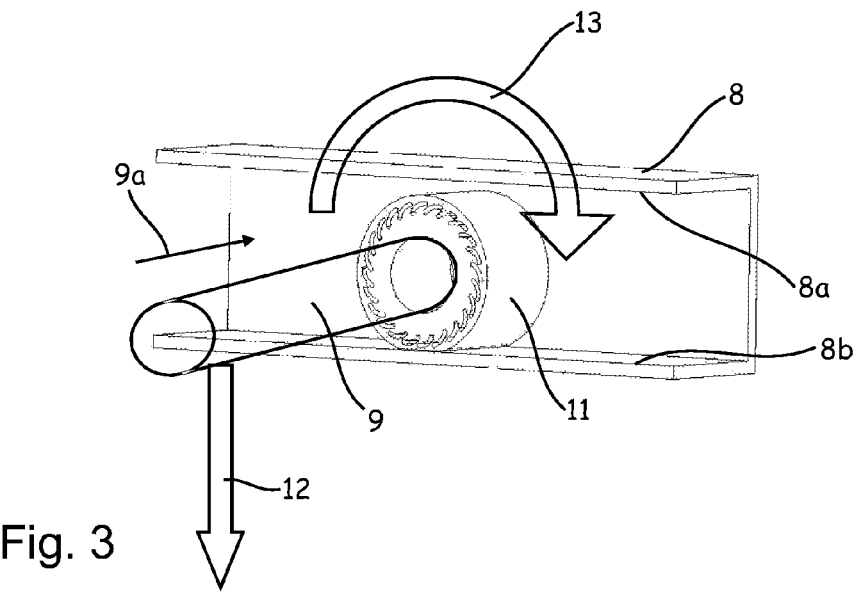
FIG. 3 shows in a perspective diagram a detail of the roller guide of the vehicle seat according to the invention.

FIG. 3 shows in a perspective diagram the U-shaped guide profile or respectively the guide rail 8 with an inner wall 8a on the upper side or respectively lower side or the roller and an inner wall 8b on the lower side or respectively upper side of the roller. It can be seen from this illustration that when it moves to the right—viewed in the image plane—i.e. performs a rolling movement in accordance with the round arrow 13, the roller 11 rolls along the lower-side inner wall 8b. The axis 9 obviously moves together with the roller in this direction and has an axial direction 9a.

This kind of movement of the roller to the right is only possible, however, if pressurization occurs in accordance with arrow 12 due, by way of example, to seat occupation by means of a person. The roller 11 is pushed downwards hereby and undergoes a deformation of its lower side which is the contact side with the lower-side inner wall 8b of the guide rail 8. The roller is therefore released at its upper side, i.e. with respect to the upper-side inner wall 8a of the guide rail 8.

Figure 4:
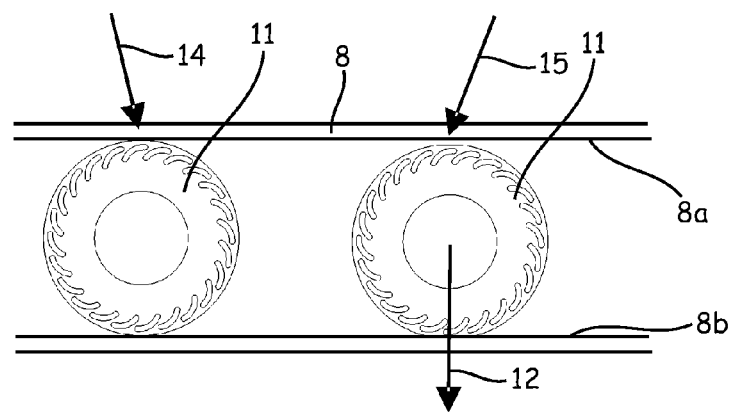
FIG. 4 shows in a cross-section the roller guide for the vehicle seat according to the invention with a roller in a state free of play and in a free-rolling state.

This becomes clear on closer consideration of FIG. 4 in which a roller 11 is reproduced in its play-free state and in its free-rolling state in a cross-sectional view. It can clearly be seen in this illustration that as soon as it undergoes pressurization 12, by way of example by means of seat occupation, the roller 11 undergoes a type of free-rolling or respectively detachment from the upper-side inner wall 8a in its upper region. This is illustrated by the arrow 15.

By contrast, where there is no pressurization the roller rests free from play at its upper side with respect to the upper-side inner wall 8a of the guide rail. This is illustrated by the arrow 14. Blocking of the roller 11 inside the guide rail 8 occurs as a result, and this is desired.

Figure 5:
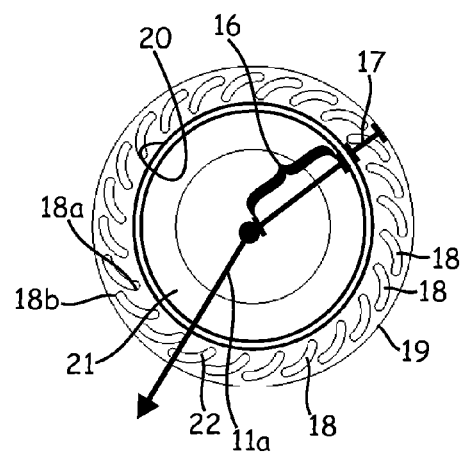
FIG. 5 shows in a cross-section a roller for the roller guide of the vehicle seat according to the invention.
Figure 6C:
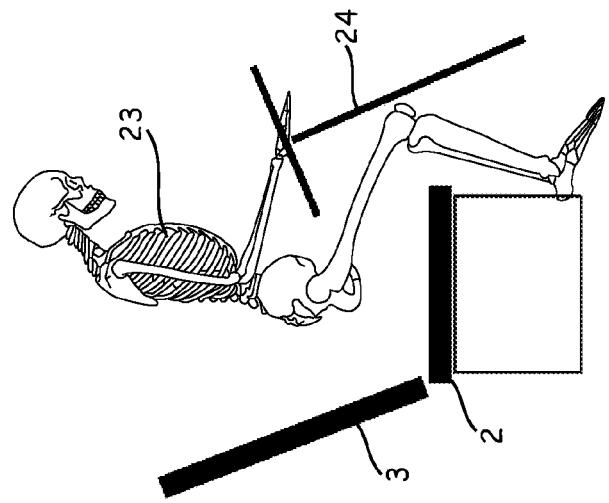
FIG. 6a, b, c show in a lateral schematic diagram the function of the roller guide of the vehicle seat according to the invention.
Figure 6B:
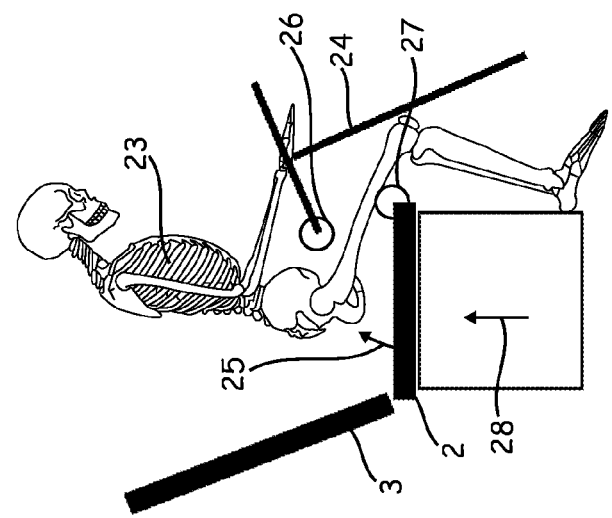
Figure 6A:
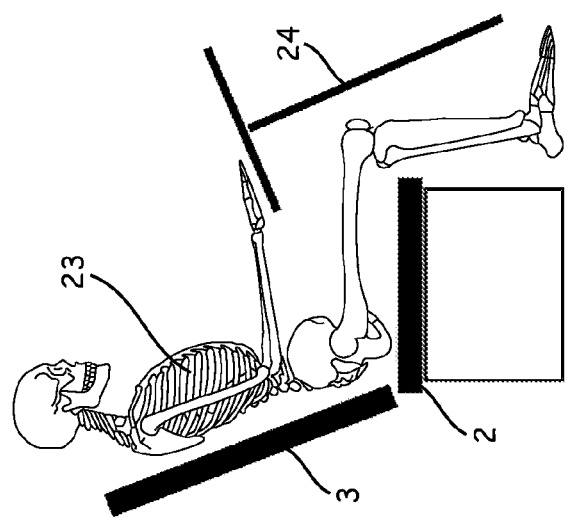

The roller per se for the roller guide of the vehicle seat according to the invention is considered in more detail in FIG. 5. It can be seen in this illustration that the roller comprises a roller core part 21, which can be constructed entirely as a tubular sheathing, and a roller cover part 22.

The roller cover part 22 encircles the roller core part 21 on its circumferential surface 20.

The roller cover part 22 is preferably made from a resilient material which undergoes a reduction in thickness on pressurization and hereby releases the roller with respect to the upper-side inner wall 8a in the upper region.

The roller cover part 22 preferably has a thickness 17 which is chosen in the ratio to the radius 16 of the roller core part from a range of 1:1.5, preferably 1:2.5.

Inside the resilient material of the roller cover core leaf-like elements 18 are arranged which—as may be seen in this diagram—overlap at least partially.

These leaf-like elements have a first end 18a which ends opposite the circumferential surface 20 and is optionally secured thereto, or else is also embedded only above the resilient material of the roller cover part.

The leaf-like elements 18 are strip-like and extend along the axial direction 9a on the circumferential surface 20 of the roller core part 21.

A first end of the leaf-like elements 18 extends outwardly, viewed in the radial direction 11a, and due to a spring-like construction can independently extend radially outwards again and again if no pressurization occurs. On pressurization 12, however, these leaf-like elements are bent in or respectively deformed inwardly, i.e. towards the axial direction, in the radial direction.

The running surface 19 or respectively circumferential surface 19 of the roller cover part 22 is used to roll the roller on the inner wall 8d of the guide rail.

All features disclosed in the application documents are claimed as being essential to the invention if they are novel individually or combined compared to the state of the art.

LIST OF REFERENCE CHARACTERS 1 vehicle seat
2 seat part
3 back rest
4 arm rest
5 lower part
6 upper part
7 scissor arms
8 guide rails
8a inner wall on the upper side (of the roller)
8b inner wall on the lower side (of the roller)
9 axis
9a axial direction/longitudinal course
10 damper
11 roller
11a radial direction
12 arrow/pressurization
13 round arrow
14 arrow
15 arrow
16 radius
17 thickness
18 leaf-like elements
18a first end/longitudinal strip side
18b longitudinal strip side
19 running surface/circumferential surface
20 circumferential surface
21 roller core part
22 roller cover part

What is claimed is:

1. A vehicle seat with a roller guide, wherein the roller guide comprises:
   at least one guide rail, which is at least partially open at a vertical side, and
   at least one roller comprising an inner roller core part and a roller cover part, wherein the roller rolls in the guide rail and is connected by at least one shaft to a portion of the vehicle seat, wherein the roller cover part of the roller can roll with a running surface of the roller along an inner wall, on a lower side of the roller, of the guide rail arranged parallel to or at an angle to a longitudinal course of the shaft, wherein at least the roller cover part of the roller is made from material that can be deformed by pressurization by means of seat occupation, and wherein in a movement-free state without seat occupation the roller cover part rests on the inner wall, on the lower side of the roller, and a second inner wall, running parallel thereto on an upper side of the roller, of the guide rail so as to make contact.

2. The vehicle seat according to claim 1, wherein the roller cover part is made of resilient material.

3. The vehicle seat according to claim 1, wherein the roller cover part has a large number of leaf springs which can be deformed in a radial direction of the roller and extend at least partially radially outwards.

4. The vehicle seat according to claim 3, wherein the leaf springs are designed as strips and extend in a strip like manner in an axial direction and end with a first longitudinal strip side on a circumferential surface of the inner roller core part made of non-resilient material.

5. The vehicle seat according to claim 4, wherein the first longitudinal strip sides are secured to the circumferential surface and second longitudinal strip sides of the leaf springs are spaced apart from the circumferential surface of the inner roller core part in the radial direction.

6. The vehicle seat according to claim 4, wherein the leaf springs overlap at least partially.

7. The vehicle seat according to claim 1, wherein a thickness of the roller cover part in a radial direction and a radius of the inner roller core part is in a ratio from a range of 1:9 to 1:1.

8. The vehicle seat according to claim 1, wherein during pressurization the deformable material of the roller cover part undergoes a reduction in its thickness of from 0.005 to 0.8 mm, preferably 0.01 to 0.3 mm in a region of contact with the inner wall on the lower side of the roller.

9. The vehicle seat according to claim 1, wherein in the movement-free state without seat occupation, the roller is pressed so strongly against the inner wall, on the lower side of the roller, and the second inner wall, on the upper side of the roller, of the guide rail that the roller is blocked inside the guide rail.

10. The vehicle seat according to claim 1, wherein a thickness of the roller cover part in a radial direction and a radius of the inner roller core part is in a ratio of 1:2.

11. The vehicle seat according to claim 1, wherein the roller cover part of the roller is deformed at its lower side by pressurization by means of seat occupation and the roller cover part no longer makes contact at its upper side with the second inner wall of the guide rail such that blocking-free rolling of the roller inside the guide rail is possible.

12. A vehicle seat with a roller guide, wherein the roller guide comprises:
   a guide rail, which is at least partially open at a vertical side; and
   a roller comprising an inner roller core part and a roller cover part, wherein the roller rolls in the guide rail and is connected by at least one shaft to a portion of the vehicle seat, wherein the roller cover part of the roller can roll with a running surface of the roller along an inner wall, on a lower side of the roller, of the guide rail arranged parallel to or at an angle to a longitudinal course of the shaft, wherein at least the roller cover part of the roller is made from material that can be deformed by pressurization by means of seat occupation and in a movement-free state without seat occupation rests on the inner wall, on the lower side of the roller, and a second inner wall, running parallel thereto on an upper side of the roller, of the guide rail so as to make contact, and wherein the roller cover part has a large number of leaf springs which can be deformed in a radial direction of the roller and extend at least partially radially outwards.

13. A vehicle seat with a roller guide, wherein the roller guide comprises:
   guide rail, which is at least partially open at a vertical side; and
   roller comprising an inner roller core part and a roller cover part, wherein the roller rolls in the guide rail and is connected by at least one shaft to a portion of the vehicle seat, wherein the roller cover part of the roller can roll with a running surface of the roller along an inner wall, on a lower side of the roller, of the guide rail arranged parallel to or at an angle to a longitudinal course of the shaft, wherein at least the roller cover part of the roller is made from material that can be deformed by pressurization by means of seat occupation and in a movement-free state without seat occupation rests on the inner wall, on the lower side of the roller, and a second inner wall, running parallel thereto on an upper side of the roller, of the guide rail so as to make contact, and wherein in the movement-free state without seat occupation, the roller is pressed so strongly against the inner wall, on the lower side of the roller, and the second inner wall, on the upper side of the roller, of the guide rail that the roller is blocked inside the guide rail.

* * * * *